(12) United States Patent
Barkai et al.

(10) Patent No.: US 12,547,941 B2
(45) Date of Patent: Feb. 10, 2026

(54) CONTEXT-BASED ANOMALY DETECTION

(71) Applicant: ServiceNow, Inc., Santa Clara, CA (US)

(72) Inventors: Efrat Barkai, Givatayim (IL); Yafit Segal, Petah Tikva (IL); Neta Hasdai-Rippa, Tel Aviv (IL); Nir Arazy, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 113 days.

(21) Appl. No.: 18/391,311

(22) Filed: Dec. 20, 2023

(65) Prior Publication Data

US 2025/0211600 A1  Jun. 26, 2025

(51) Int. Cl.
*G06N 20/00* (2019.01)
*A61B 5/02* (2006.01)
*G06V 10/25* (2022.01)
*H04L 9/40* (2022.01)
*H04L 41/16* (2022.01)

(52) U.S. Cl.
CPC ......... *G06N 20/00* (2019.01); *A61B 5/02028* (2013.01); *G06V 10/25* (2022.01); *H04L 41/16* (2013.01); *H04L 63/1425* (2013.01)

(58) Field of Classification Search
CPC ...... G06N 20/00; G06N 20/20; G06F 11/079; G06F 11/0709; H04L 63/1425; A61B 5/02028; A61B 5/6846; A61B 5/7275; A61B 5/0205; A61N 1/3702; G16H 20/30; G16H 50/20; G16H 50/30; G16H 40/63; G06V 10/25; G06V 20/44; G06V 10/70; G06V 10/768; G06V 10/764; G06V 20/50; G06V 10/255; G06V 10/95; G08B 13/19604; G08B 13/19663; G06T 7/70

See application file for complete search history.

(56) References Cited

U.S. PATENT DOCUMENTS 9,166,993 B1 * 10/2015 Liu ..................... H04L 63/1425
10,917,419 B2    2/2021 Crotinger
2011/0224748 A1 *  9/2011 Lippert .............. A61B 5/02028
                                                        600/481
2021/0026698 A1    1/2021 Lemberg
2022/0366683 A1 * 11/2022 Pereg ..................... G06V 10/25
2024/0036963 A1 *  2/2024 Azeez ..................... G06N 20/00

FOREIGN PATENT DOCUMENTS

CN        109542740        5/2022

* cited by examiner

*Primary Examiner* — Kyung H Shin
(74) *Attorney, Agent, or Firm* — MCDONNELL BOEHNEN HULBERT & BERGHOFF LLP

(57) ABSTRACT

Time-series data is received. Using an identifier of the time-series data, contextual reference anomaly detection parameters are identified from a repository. A data trend of the time-series data is classified. Based on the classified data trend, a type of model to be generated for the time-series data is selected and a model having generated anomaly detection parameters is generated. A history of anomaly detection parameters determined for the time-series data is identified, and the generated anomaly detection parameters are adjusted based on the contextual reference anomaly detection parameters and the history of anomaly detection parameters.

18 Claims, 11 Drawing Sheets

CONTEXT-BASED ANOMALY DETECTION

BACKGROUND OF THE INVENTION

Anomaly detection can be used to detect events that fall outside a normal trend. The detected deviation or outlier incident can be an indicator that an error, failure, defect, or suspicious event has occurred. When an anomaly has been detected, typically an operations team is notified of the incident and may be assigned to investigate and address the underlying cause. Common uses for anomaly detection include data cleaning, intrusion detection, fraud detection, system health monitoring, and identifying ecosystem disturbances.

BRIEF DESCRIPTION OF THE DRAWINGS

Various embodiments of the invention are disclosed in the following detailed description and the accompanying drawings.

DETAILED DESCRIPTION

Figure 1:
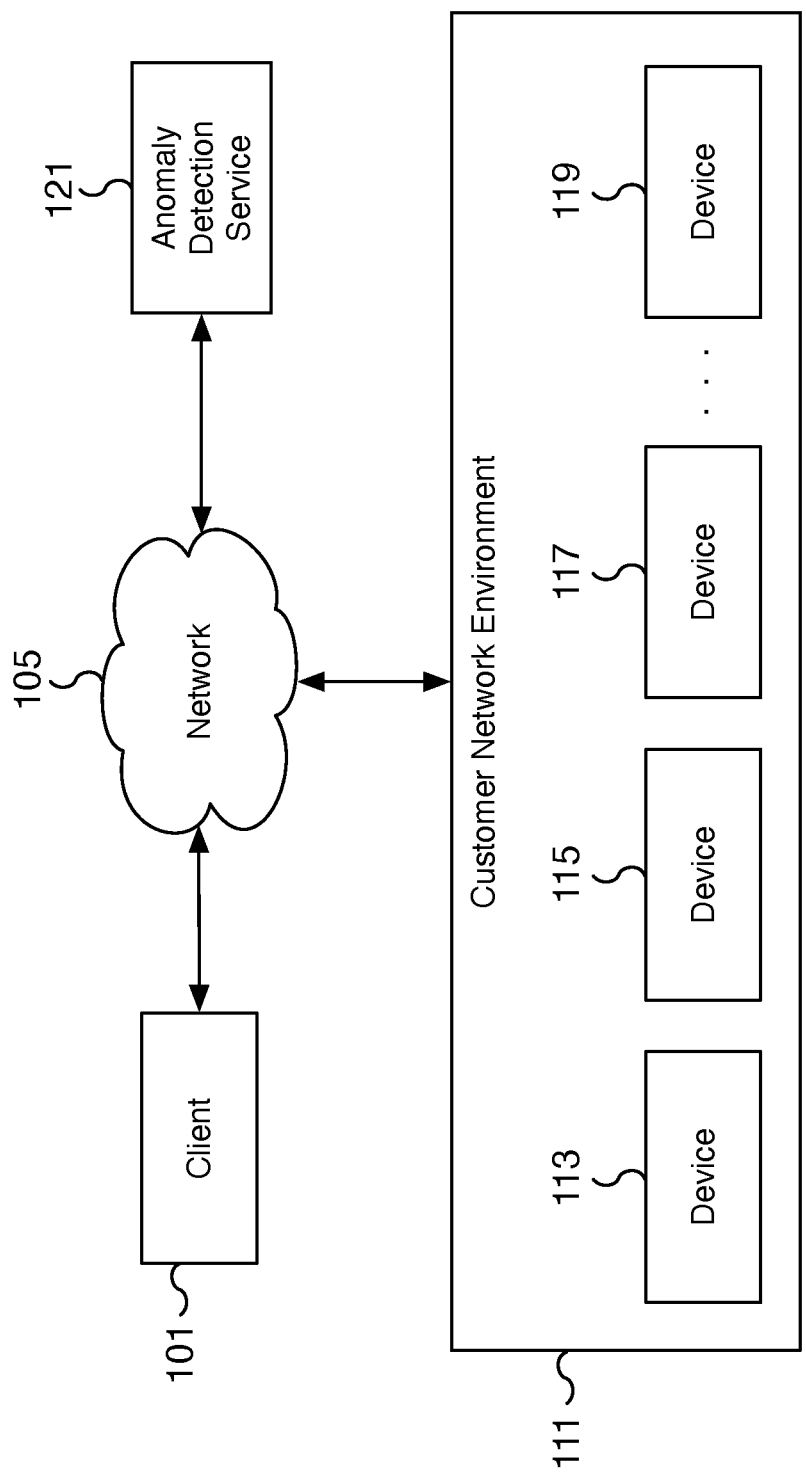
FIG. 1 is a block diagram illustrating an example of a network environment for performing context-based anomaly detection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Context-based anomaly detection is disclosed. For example, using the disclosed context-based anomaly detection techniques and systems, anomalies can be detected with significantly higher accuracy rates by applying context-based bounds on prediction scores. Specifically, the application of context-based bounds can result in a substantial reduction in the number of false positives when predicting anomalies. In some embodiments, anomalies are detected by applying a model to predict anomalies based on a time series of data collected by monitoring a particular metric. Example metrics that can be monitored include network utilization, the number of incoming packets per second, the number of outgoing packets per second, device CPU speed, device CPU utilization, device CPU temperature, device memory usage, and device swap size, among other metrics. The applied model can be one of a variety of different models depending on the specific metric and its properties. For example, a particular metric can exhibit seasonal characteristics, exhibit certain trends, and/or be largely noisy, etc. and a model is selected based on the particular properties of the metric. Example model types include statistical models, machine learning models, and/or other types of models. In various embodiments, the context-based bounds are applied to the anomaly scores predicted by the selected model, for example, to remove false positives. In part due to its context-based nature, the determined context-based bounds can be more accurate and precise than the data utilized in the training of the selected model, resulting in final prediction results that are significantly more accurate. In some embodiments, the applied context-based bounds are determined by integrating multiple layers of context-based analysis.

In some embodiments, the context-based bounds to apply for prediction scores for detecting an anomaly are determined by performing and integrating at least three layers of context-based analysis. For example, a first layer utilizes the name of the monitored metric to determine context-based knowledge. The context-based knowledge layer can include processing the metric name to determine existing context-based knowledge applicable for anomaly detection. Example context-based knowledge anomaly detection parameters can include prior knowledge of an applicable upper bound, an applicable lower bound, and whether a higher (or lower) value is associated with a decrease in the likelihood of an anomaly. In some embodiments, the context-based knowledge anomaly detection parameters for a particular metric are determined by searching known repositories of context-based knowledge anomaly detection parameters for the same or similar metric.

In some embodiments, a second layer of context-based analysis can involve selecting and fitting an appropriate model, such as statistical, machine learning, or another model type, to the monitored time-series data collected for a metric. Example models can include seasonal models, trend-based models, stationary models, noise-based models, and near-constant models, among other models. The models are trained using data that can include certain windows of historical data. Accuracy results in anomaly prediction are significantly increased by fitting and selecting the appropriate context-based model for the particular metric. In some embodiments, an existing source of trained models exists for different metrics and/or metric types. In some embodiments, one or more additional models can be trained based on the determined model and its fit for the particular metric.

In some embodiments, a third layer of context-based analysis can involve applying context-based historical knowledge related to data distribution. For example, historical data can be collected and aggregated to preserve certain data distribution properties relevant to the monitored metric for anomaly detection. Example data distribution properties can include statistical information such as the maximum historical value and the minimum historical value. Additional historical data distribution data knowledge can include data distribution information related to the standard deviation, mean, skewness, kurtosis, and highest anomalous data point among historical values, among other aggregated historical data distribution information.

In various embodiments, the context-based data and parameters determined from the different layers of context-based analysis are integrated to determine a context-based bounds to apply to prediction scores. For example, context-based knowledge from a first layer, if available, can be used to accurately adjust the bounds applied to trigger an alerted anomaly. In some embodiments, the context-based detection parameters from a first layer of context-based analysis are applied as additional parameters for the selected context-based model of the second layer of analysis. By applying the first layer analysis results to the selected context-based model, the number of false positives is significantly reduced. In various embodiments, the historical data distribution knowledge of a third layer of analysis is applied to the result of integrating the first two layers. As one example, the data distribution knowledge from aggregated historical data can be used to inform the anomaly detection system of the historical values required for an anomaly. The additional application of context-based historical data distribution knowledge results in a further improvement in the accuracy of anomaly prediction results.

In some embodiments, an anomaly detection system receives a time-series of data. For example, time-series data is collected by monitoring a metric such as network utilization, the rate of incoming packets, the rate of outgoing packets, device CPU speed, device CPU utilization, device CPU temperature, device memory usage, or device swap size, among other metrics. The data can be collected, for example, by a monitoring agent, and can be provided as time-series data to an anomaly detection service to predict anomalies. In some embodiments, using an identifier of the time-series data, contextual reference anomaly detection parameters are identified from a repository. For example, the name of the metric can be processed and analyzed to identify context-based anomaly detection parameters by searching known repositories of parameters for the same or similar metric. In some embodiments, the metric name is tokenized and converted into an identifier that is used to identify the best match among other metrics based on a similarity score. The contextual reference anomaly detection parameters stored for the best matching metric can be retrieved from the corresponding repository and used as contextual reference anomaly detection parameters for the monitored metric, such as to inform context-based bounds for anomaly prediction.

In some embodiments, a data trend of the time-series data is classified. For example, a monitored metric is analyzed to determine the data trend of the underlying metric data. The data trend can be classified into one of multiple different types, such as seasonal data, noisy data, constant data, matching certain trends, etc. In some embodiments, based on the classified data trend, a type of model to be generated for the time-series data is selected and a model having generated anomaly detection parameters is generated. For example, the classified data trend can be used to fit the monitored metric to a particular model type and a model of the selected model type is generated for anomaly prediction. The generated model can include certain anomaly detection parameters, such as factors or features that influence anomaly prediction results.

In some embodiments, a history of anomaly detection parameters determined for the time-series data is identified. For example, historical data related to anomaly detection for the monitored metric is identified. The identified data is based on time-series data relevant for the monitored metric and can span all historical data for the metric even exceeding the data used for training the selected model. The identified historical data can be stored as aggregated data and can include historical anomaly detection parameters such as the maximum historical value and the minimum historical value among other historical anomaly detection parameters including historical statistical information relevant to context-based anomaly detection. In some embodiments, the generated anomaly detection parameters are adjusted based on the contextual reference anomaly detection parameters and the history of anomaly detection parameters. For example, parameters for anomaly detection associated with the selected model are adjusted based on the identified contextual reference anomaly detection parameters and the history of anomaly detection parameters. In some embodiments, the adjustment includes adjusting the bounds applied to prediction scores such that the bounds are context-based and factor in knowledge of similar metrics and historical information related to the metric. In various embodiments, the adjusted parameters, including the context-based adjustment to one or more bounds, are used for predicting anomalies based on the received time-series data. In some embodiments, the anomaly prediction results are provided by the anomaly detection service.

FIG. 1 is a block diagram illustrating an example of a network environment for performing context-based anomaly detection. In the example shown, client 101 and anomaly detection service 121 are connected via network 105. Network 105 can be a public or private network. In some embodiments, network 105 is a public network such as the Internet. In various embodiments, anomaly detection service 121 corresponds to a cloud-based application server that provides a service for predicting anomalies, such as anomalies within an information technology (IT) infrastructure such as customer network environment 111. For example, customer network environment 111 is monitored and metrics related to customer network environment 111 and its devices are provided to anomaly detection service 121 where one or more models are used to predict anomalies using context-based anomaly detection parameters. In some embodiments, the predicted anomalies are displayed in an interactive user interface dashboard provided by anomaly detection service 121 and accessible from clients such as client 101. In the example shown, example devices of customer network environment 111 include devices 113, 115, 117, and 119.

In some embodiments, client 101 is an example client for accessing anomaly detection service 121. Client 101 is a network device such as a desktop computer, a laptop, a mobile device, a tablet, a kiosk, a voice assistant, a wearable device, or another network computing device. As a network device, client 101 can access cloud-based services including anomaly detection service 121. For example, a member of the information technology service management (ITSM) team can utilize a web browser or similar application from client 101 to receive notifications of a predicted anomaly, to review predicted anomalies (such as via an interactive dashboard), to view the performance of the anomaly detection service provided by anomaly detection service 121, and/or to provide feedback on anomaly detection service 121. Although shown in FIG. 1 as located outside of customer network environment 111, client 101 can also be located within customer network environment 111.

In some embodiments, anomaly detection service 121 offers a cloud-based anomaly detection service for predicting anomalies such as those occurring within an IT infrastructure such as customer network environment 111. In various embodiments, the anomalies are predicted by evaluating time-series data of one or more monitored metrics collected on an environment such as by monitoring customer network environment 111 and its devices. Example metrics that can be collected and applied as input for anomaly prediction include but are not limited to metrics related to network utilization, the number of incoming packets per second, the number of outgoing packets per second, device CPU speeds, device CPU utilization, device CPU temperatures, device memory usages, device swap sizes, and the number of running processes, among others. In various embodiments, anomaly detection service 121 utilizes context-based anomaly prediction by applying one or more layers of context-based analysis to improve anomaly prediction results. For example, the multiple layers of context-based analysis can include retrieving context-based knowledge of the monitored metric from known repositories of similar or matching metrics, selecting and training a context-based model based on the class or type of the monitored metric including based on data trends associated with the metric, and utilizing historical context-based distribution data for the monitored metric. The various different layers of context-based analysis can be integrated and utilized by anomaly detection service 121 to provide anomaly detection results that exhibit a high degree of accuracy with significant reduction in false positives. In various embodiments, the results of anomaly prediction are provided for an administrator or operator to review, such as an administrator or operator associated with client 101.

In some embodiments, customer network environment 111 is an information technology network environment and includes multiple hardware devices including devices 113, 115, 117, and 119, as examples. Devices 113, 115, 117, and 119 correspond to hardware devices that are managed by an ITSM group and each device can be one of a variety of different hardware device types including networking equipment (such as gateways and firewalls), load balancers, servers including application servers and database servers among other servers, and other computing devices including employee laptops and desktops. For example, in one scenario, devices 113, 115, 117, and 119 are each servers and one of the servers may have a hardware failure that triggers a predicted anomaly as detected by anomaly detection service 121. In various embodiments, customer network environment 111 is connected to network 105. In various embodiments, the topology of customer network environment 111 can differ and the topology shown in FIG. 1 is just one simplified example.

Although single instances of some components have been shown to simplify the diagram of FIG. 1, additional instances of any of the components shown in FIG. 1 may exist. For example, anomaly detection service 121 may be implemented using one or more servers such as one or more distributed application servers. In some embodiments, the implementation of anomaly detection service 121 further utilizes one or more databases. Different network topologies for implementing anomaly detection service 121 are appropriate and the servers and/or databases utilized by anomaly detection service 121 may be replicated and/or distributed across multiple servers, databases, and/or related components. Additionally, client 101 is an example client device for interfacing with anomaly detection service 121. Although a single client is shown (i.e., client 101), many more additional clients can exist and can be used to interface with anomaly detection service 121. As mentioned above, customer network environment 111 is just one example of a network environment of devices monitored for anomalies by anomaly detection service 121. For example, in various embodiments, anomaly detection service 121 can manage additional network environments not shown including different distributed environments and different sub-networks. In some embodiments, components not shown in FIG. 1 may also exist.

Figure 2:
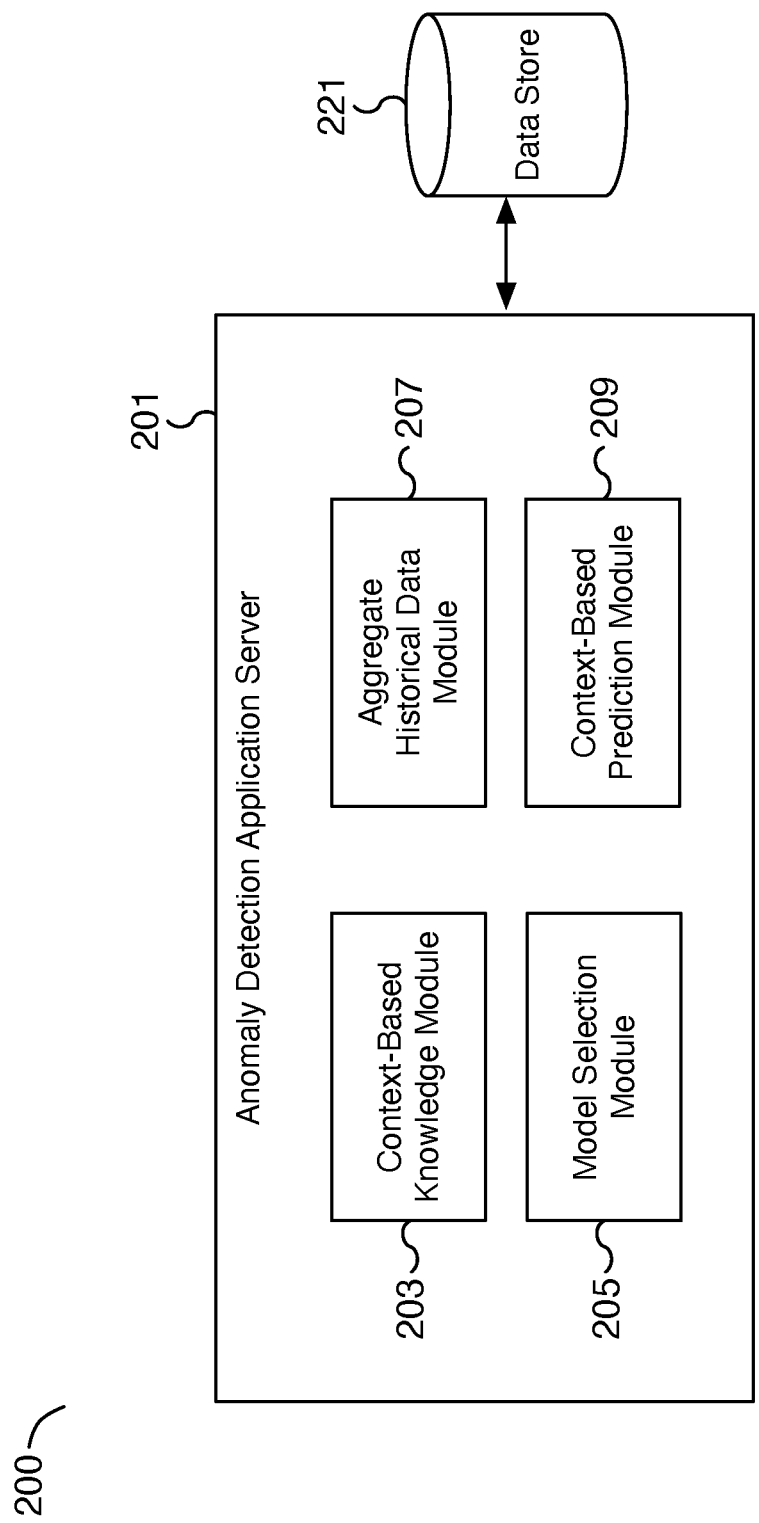
FIG. 2 is a block diagram illustrating an embodiment for implementing a context-based anomaly detection service.

FIG. 2 is a block diagram illustrating an embodiment for implementing a context-based anomaly detection service. In the example shown, anomaly detection service 200 includes anomaly detection application server 201 and data store 221. In various embodiments, the shown components of anomaly detection application server 201 and data store 221 are used to implement an anomaly detection service for predicting anomalies based on multiple layers of context-based analysis. For example, anomaly detection application server 201 using data store 221 implements the functionality for predicting anomalies for an IT infrastructure using a context-based approach. In some embodiments, anomaly detection service 200 is anomaly detection service 121 of FIG. 1.

In some embodiments, anomaly detection application server 201 includes multiple modules as shown in FIG. 2 for implementing the different functionality of anomaly detection service 200. As shown in the example, anomaly detection application server 201 includes context-based knowledge module 203, model selection module 205, aggregate historical data module 207, and context-based prediction module 209. Although shown as distinct modules, the functionality of the modules of anomaly detection application server 201 may be implemented in fewer or more modules and/or distributed across different application servers. For example, some of the modules may be combined into a single module and/or some of the modules may be separated, replicated, and/or distributed into or as additional modules, as appropriate. Moreover, although anomaly detection application server 201 is shown as a single server, its functionality can be implemented and/or distributed across multiple servers including multiple distributed servers. For example, in some embodiments, model selection module 205 can be implemented using one or more machine learning inference servers different from the machine learning inference servers of context-based prediction module 209. In some embodiments, modules of anomaly detection application server 201 may exist but are not shown. For example, a feedback module for collecting user feedback on detected anomalies may exist but is not shown. As another example, modules related to preparing training data and/or training one or more models may exist and be utilized, for example, by model selection module 205 and/or context-based prediction module 209, but are not shown.

In some embodiments, context-based knowledge module 203 is a processing module for determining context-based knowledge relevant for anomaly detection. For example, the monitored metric is analyzed to retrieve existing anomaly detection knowledge such as context-based anomaly detection parameters for the same or similar metric. In some embodiments, the name of the monitored metric is tokenized and/or converted to one or more identifiers that are used to identify the best matching metric from which to retrieve anomaly detection parameters. For example, the relevant existing knowledge can be retrieved by matching metric identifiers to a corresponding context-based knowledge repository, such as a repository associated with data store 221. Example context-based knowledge anomaly detection parameters can include prior knowledge of an applicable upper bound, an applicable lower bound, and whether a higher (or lower) value is associated with a decrease in the likelihood of an anomaly.

In some embodiments, model selection module 205 is a processing module for selecting and fitting an appropriate model, such as statistical, machine learning, or another model type, to the monitored time-series data collected for a metric. Example models selected by model selection module 205 can include seasonal models, trend-based models, stationary models, noise-based models, and near-constant models, among other models. In some embodiments, model selection module 205 includes training functionality to train a selected model using selected historical data. In some embodiments, the selected model may be pretrained and no additional training is required. In various embodiments, the selected models and/or related training data can be stored in an associated data store such as data store 221.

In some embodiments, aggregate historical data module 207 is a processing module for applying context-based historical knowledge related to data distribution to the anomaly detection process. For example, relevant historical data can be identified and retrieved by aggregate historical data module 207. In some embodiments, aggregate historical data module 207 stores and manages the historical data including aggregating the historical data and determining statistical properties of the historical data. In various embodiments, the data distribution properties of the historical data relevant for anomaly detection are applied by aggregate historical data module 207 and can include statistical information such as the maximum historical value and the minimum historical value. Additional historical data distribution data knowledge can include data distribution information related to the standard deviation, mean, skewness, kurtosis, and highest anomalous data point among historical values, among other aggregated historical data distribution information. In various embodiments, the aggregated historical data utilized by aggregate historical data module 207 can be stored in an associated data store such as data store 221.

In some embodiments, context-based prediction module 209 is a processing module for performing context-based anomaly detection. Context-based prediction module 209 incorporates the context-based analysis performed by context-based knowledge module 203, model selection module 205, and/or aggregate historical data module 207. For example, the different analysis results including context-based anomaly detection parameters determined by the different modules of anomaly detection application server 201 can be integrated at and by context-based prediction module 209 and applied to received time-series data of the monitored metric to predict anomalies. In particular embodiments, context-based prediction module 209 applies the context-based anomaly detection parameters provided by context-based knowledge module 203 as additional parameters to the selected context-based model selected by model selection module 205. In some embodiments, the historical data distribution knowledge identified and retrieved by aggregate historical data module 207 can be further incorporated and applied by context-based prediction module 209. In various embodiments, the prediction results of context-based prediction module 209 are refined using the context-based analysis at least in part by applying context-based bounds to anomaly prediction scores.

In some embodiments, data store 221 corresponds to one or more data stores utilized by anomaly detection application server 201 for storing and/or retrieving data for anomaly detection. For example, data store 221 can store and provide access to context-based knowledge repositories for context-based knowledge module 203, context-based models to fit a particular monitored metric for model selection module 205, and/or aggregated historical data distribution data for aggregate historical data module 207. In some embodiments, data store 221 is utilized by context-based prediction module 209 for storing and accessing context-based parameters including context-based anomaly detection parameters for prediction anomalies. The context-based parameters can include parameters determined by context-based knowledge module 203, model selection module 205, and/or aggregate historical data module 207. In some embodiments, data store 221 is used to store configuration and/or results for the various modules of anomaly detection application server 201 including context-based knowledge module 203, model selection module 205, aggregate historical data module 207, and/or context-based prediction module 209. In some embodiments, data store 221 is implemented as one or more distributed and/or replicated data stores or databases. For example, one or more portions of data store 221 may be located at a different physical location (such as in a different data center) than anomaly detection application server 201. In various embodiments, data store 221 is communicatively connected to anomaly detection application server 201 via one or more network connections.

Figure 3:
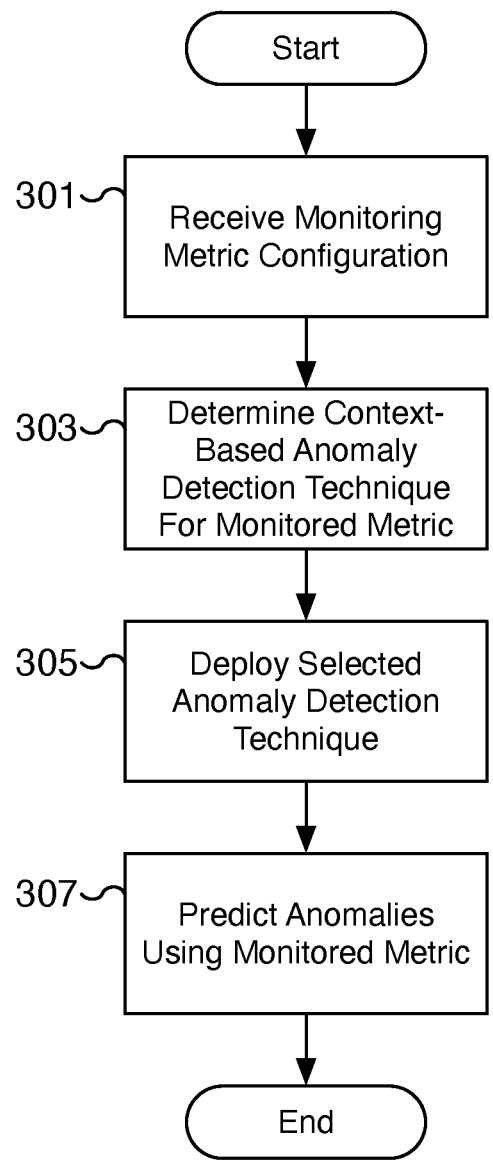
FIG. 3 is a flow chart illustrating an embodiment of a process for performing context-based anomaly detection.

FIG. 3 is a flow chart illustrating an embodiment of a process for performing context-based anomaly detection. For example, using the process of FIG. 3, an anomaly detection service detects anomalies, such as within an IT infrastructure environment, based on provided input data. The provided input data can be time-series data of a monitored metric collected by monitoring the target environment. In various embodiments, the anomaly detection service utilizes a prediction model fitted and selected for the metric along with additional context-based anomaly detection parameters, such as context-based bounds to apply to prediction scores. In some embodiments, the anomaly detection service is anomaly detection service 121 of FIG. 1 and/or anomaly detection service 200 of FIG. 2. In some embodiments, the anomaly detection results are provided to a client such as client 101 of FIG. 1. In some embodiments, the anomalies are detected within an IT infrastructure environment such as customer network environment 111 of FIG. 1.

At 301, a monitoring metric configuration is received. For example, a metric is configured for monitoring and the parameters to configure the anomaly detection based on the metric are received. In some embodiments, the configuration can include details of the device within the target environment to monitor including connection parameters to the monitoring agent or service providing the monitored data. In some embodiments, the configuration includes providing details of the monitoring metric including a name and/or description of the metric. Additional details can include associations with training data and/or historical data related to the metric and/or device. In some embodiments, anomaly detection configuration parameters are provided including a workflow to perform once an anomaly is detected. For example, notifications can be configured to inform an operator and/or administration when an anomaly is detected. Similarly, failover processes can be initiated when an anomaly is detected. In some embodiments, the monitoring metric configuration is stored in a configuration management database (CMDB)

At 303, a context-based anomaly detection technique is determined for the monitored metric. For example, an anomaly detection technique the utilizes the context of the monitored metric for improved prediction accuracy is determined. In some embodiments, the selected anomaly detection technique utilizes multiple layers of context-based analysis that are integrated to improve the accuracy of anomaly detection for the specified metric. For example, a first layer of context-based analysis can include processing the metric name to determine existing context-based knowledge applicable for anomaly detection such as an applicable upper bound, an applicable lower bound, and whether a higher (or lower) value is associated with a decrease in the likelihood of an anomaly. A second layer of context-based analysis can involve selecting and fitting an appropriate context-based model, such as statistical, machine learning, or another model type, to the monitored time-series metric data based on characteristics of the metric. In some embodiments, a third layer of context-based analysis involves applying context-based historical knowledge related to data distribution, such as maximum and minimum historical values and other historical data distribution data knowledge including statistical information. In various embodiments, the different context-based analysis layers can be integrated to determine context-based anomaly detection parameters, such as context-based bounds, to apply to prediction scores for predicting an anomaly using the monitored metric.

At 305, the selected anomaly detection technique is deployed. For example, the selected context-based model and context-based anomaly detection parameters are deployed to detect anomalies using the monitored metric. In some embodiments, the model is a machine learning model and the appropriate model weights are deployed to one or more inference servers. In some embodiments, the monitoring metric data is configured to be received as time-series data at the appropriate anomaly detection service and then provided to the selected prediction model. In various embodiments, once the selected anomaly detection technique is deployed, a client can monitor the deployment results via a dashboard of the anomaly detection service.

At 307, anomalies are predicted using the monitored metric. For example, time-series data of the monitored metric is received and applied to the selected context-based model with the appropriate context-based anomaly detection parameters. In various embodiments, the time-series data is processed to determine anomaly prediction scores and the scores are evaluated with respect to context-based bounds to determine whether the incoming data predicts an anomaly. In the event an anomaly is detected, the appropriate anomaly detection workflow is triggered such as notifying the appropriate entities based on the configuration received at 301.

Figure 4:
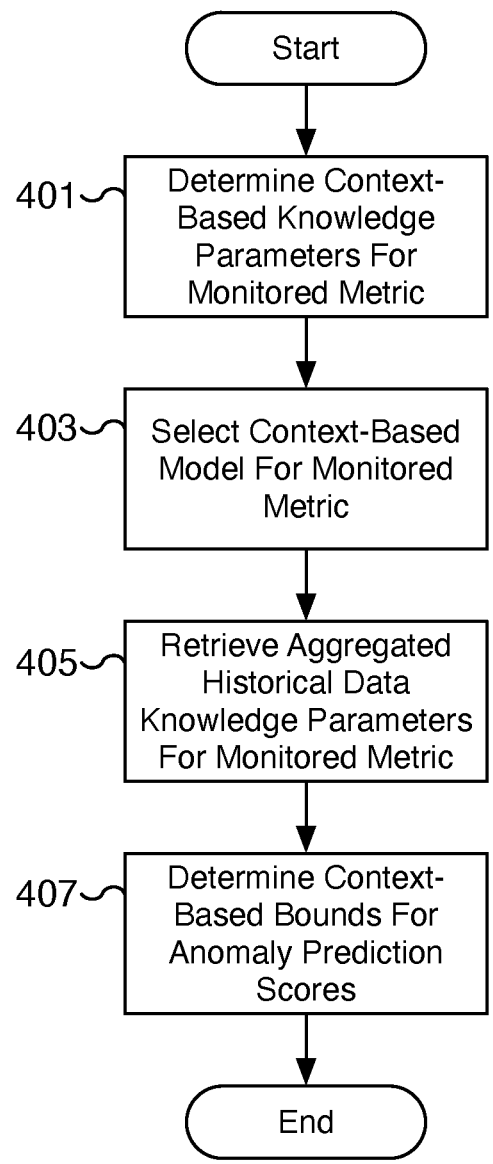
FIG. 4 is a flow chart illustrating an embodiment of a process for determining a context-based anomaly detection technique for a monitored metric.

FIG. 4 is a flow chart illustrating an embodiment of a process for determining a context-based anomaly detection technique for a monitored metric. For example, using the process of FIG. 4, context-based anomaly detection parameters are determined for predicting anomalies from time-series data of a monitored metric. In various embodiments, multiple steps or layers of context-based analysis are performed and integrated to determine the appropriate context-based anomaly detection technique based on a specific metric and its properties. In particular embodiments, context-based bounds are determined for prediction scores evaluated using a context-based model that significantly reduces false positives. In some embodiments, the process of FIG. 4 is performed at 303 of FIG. 3 by an anomaly detection service such as anomaly detection service 121 of FIG. 1 and/or anomaly detection service 200 of FIG. 2. In some embodiments, the anomaly detection results are provided to a client such as client 101 of FIG. 1. In some embodiments, the anomalies are detected within an IT infrastructure environment such as customer network environment 111 of FIG. 1.

At 401, context-based knowledge parameters for the monitored metric are determined. For example, the name of the monitored metric can be analyzed to determine relevant context-based knowledge parameters by matching the name to repositories of parameters for the same or similar metric. In some embodiments, an identifier of the metric name is used to search existing repositories of context-based knowledge parameters. Example context-based knowledge anomaly detection parameters can include prior knowledge of an applicable upper bound, an applicable lower bound, and whether a higher (or lower) value is associated with a decrease in the likelihood of an anomaly.

At 403, a context-based model is selected for the monitored metric. For example, based on properties and characteristics of the monitored metric, a context-based model is selected for predicting anomalies. The selected model type can be one of a variety of model types such as a statistical model, a machine learning model, or another model type. Example models for fitting the monitored metric can include seasonal models, trend-based models, stationary models, noise-based models, and near-constant models, among other models. At 403, the selected model can be trained using data that can include certain windows of historical data. In some embodiments, an existing source of trained models exists for different metrics and/or metric types and a pre-trained model is selected.

At 405, aggregated historical data knowledge parameters are retrieved for the monitored metric. For example, historical knowledge related to data distribution of the monitored metric can be retrieved and applied for anomaly detection. In various embodiments, the historical data knowledge is stored as aggregated data allowing a wide span of historical data distribution knowledge to be stored more efficiently. Example anomaly detection parameters of historical data distribution properties that can be retrieved can include statistical information such as the maximum historical value and the minimum historical value of the monitored metric. Additional historical data distribution data knowledge can include data distribution information related to the standard deviation, mean, skewness, kurtosis, and highest anomalous data point among historical values, among other aggregated historical data distribution information.

At 407, context-based bounds are determined for anomaly prediction scores. For example, using the context-based data including parameters and other knowledge determined at steps 401, 403, and/or 405, one or more context-based anomaly prediction score bounds are determined. In various embodiments, the determined context-based bounds are more accurate and precise than the bounds determined during the training and selection of a context-based model. For example, the determination of the context-based bounds can incorporate context-based knowledge for metrics with the same or similar characteristics as well as knowledge of all historical values including the maximum historical value and the minimum historical value. For example, bounds that are statistically very far from the minimum and maximum historical values will likely result in false positives and the appropriate context-based bounds can be adjusted based on historical values including the historical minimum and maximum values. In some embodiments, the context-based bounds further take into account historical data distribution values including historical data distribution statistical values.

Figure 5:
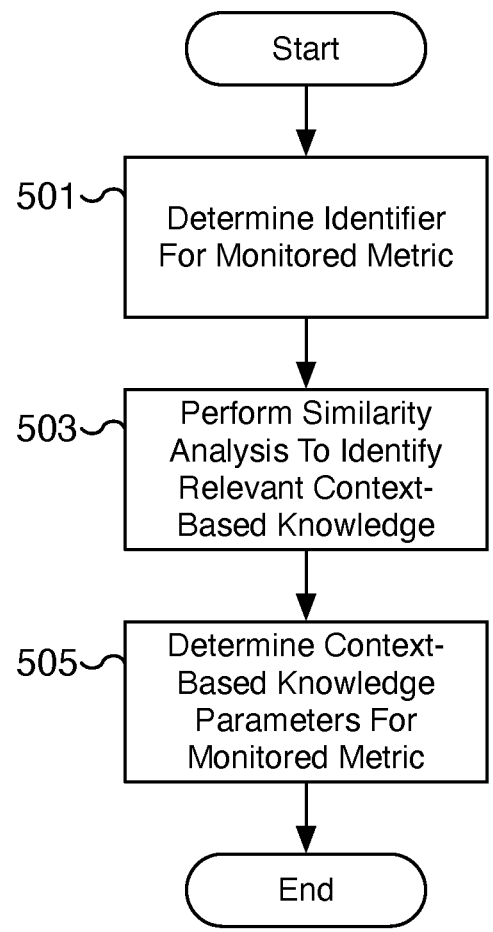
FIG. 5 is a flow chart illustrating an embodiment of a process for determining context-based knowledge parameters for a monitored metric.

FIG. 5 is a flow chart illustrating an embodiment of a process for determining context-based knowledge parameters for a monitored metric. For example, using the process of FIG. 5, context-based anomaly detection parameters are determined from existing knowledge bases and used for predicting anomalies from time-series data of a monitored metric. In various embodiments, the knowledge bases can be pre-analyzed and the relevant anomaly detection parameters stored in repositories based on a metric. In some embodiments, the data is stored in database tables within associated repositories and once retrieved, can be used to inform the anomaly prediction process including by determining context-based bounds to apply to anomaly prediction scores. In some embodiments, the process of FIG. 5 is performed at 303 of FIG. 3 and/or at 401 of FIG. 4 by an anomaly detection service such as anomaly detection service 121 of FIG. 1 and/or anomaly detection service 200 of FIG. 2. In some embodiments, the process of FIG. 5 is performed by a context-based knowledge module such as context-based knowledge module 203 of FIG. 2.

At 501, an identifier for the monitored metric is determined. For example, the monitored metric is analyzed to determine an identifier for the metric. In some embodiments, the name of the monitored metric is converted to one or more identifiers by tokenizing the identifier. For example, the metric name "CPU percentage" can be converted to an identifier by a tokenization text analysis process. The tokenization process can extract root words from the metric name for identifying similar metrics relevant to "CPU percentage" at steps 503 and/or 505. In some embodiments, the determination of the identifier includes converting the metric name to all lowercase letters and performing tokenizing lemmatization to determine the appropriate identifier. For example, the metric name can be reduced to a base form to extract the proper context from the metric name.

At 503, a similarity analysis is performed to identify relevant context-based knowledge. For example, using the identifier determined for the metric at 501, one or more knowledge repositories indexed by identifiers can be searched to identify the best matching knowledge repository. In various embodiments, the knowledge repositories are created by searching internal and external data sources (including, for example, the Internet) for relevant anomaly detection parameters such as applicable upper bound, applicable lower bound, and whether a higher (or lower) value is associated with a decrease in the likelihood of an anomaly. External data sources can include internal and external logs, documentation, crash reports, and user anomaly reports, among other data sources. In some embodiments, the best matching repository is identified by performing a similarity analysis and selecting the best matching similarity score.

At 505, context-based knowledge parameters are determined for the monitored metric. For example, based on the similarity analysis performed at 503, the best matching knowledge repository is identified, and context-based knowledge parameters are retrieved from the identified repository. The retrieved parameters can include an applicable upper bound for the metric, an applicable lower bound for the metric, and whether a higher (or lower) value is associated with a decrease in the likelihood of an anomaly. For example, in some embodiments, one or more of the retrieved parameters describe the relationship between the values of the time-series data and the likelihood of an anomaly. In some embodiments, a relationship parameter indicates whether there exists a positive correlation or a negative correlation between values of the time-series data and a likelihood of an anomaly. For example, a CPU load metric can be positively correlated and/or have a direct relationship with the likelihood of an anomaly since as the CPU load increases the likelihood an anomaly will occur also increases. As another example, a free memory metric can be negatively correlated and/or have an inverse relationship with the likelihood of an anomaly since as the amount of available free memory decreases the likelihood an anomaly will occur increases. In some embodiments, the retrieved parameters may be converted and/or normalized for the monitored metric. For example, a conversion may be performed to convert the retrieved parameters for use with the particular monitored metric. In various embodiments, the retrieved context-based knowledge parameters are provided for anomaly detection and may be utilized to determine context-based bounds to apply to anomaly prediction scores.

Figure 6:
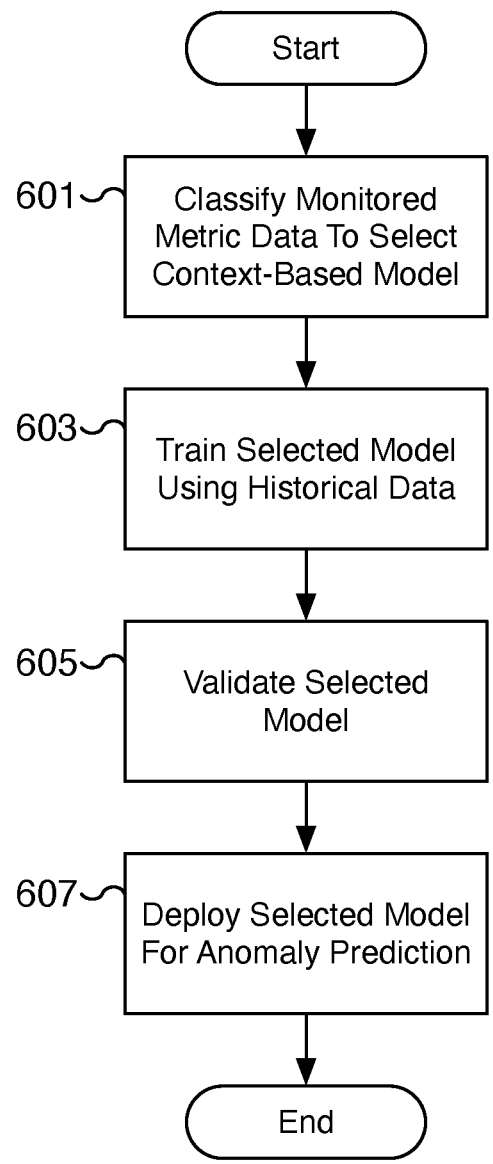
FIG. 6 is a flow chart illustrating an embodiment of a process for selecting a context-based model for a monitored metric.

FIG. 6 is a flow chart illustrating an embodiment of a process for selecting a context-based model for a monitored metric. For example, using the process of FIG. 6, a context-based model to predict anomaly scores is selected by fitting the time-series data of the monitored metric to the appropriate model. In various embodiments, the selected model can be one or a variety of different model types. The selected models may be pretrained and/or require training including additional and/or supplemental training. Once selected, the context-based model can be integrated with other anomaly detection parameters determined by other context-based analysis steps. In some embodiments, the process of FIG. 6 is performed at 303 of FIG. 3 and/or at 403 of FIG. 4 by an anomaly detection service such as anomaly detection service 121 of FIG. 1 and/or anomaly detection service 200 of FIG. 2. In some embodiments, the process of FIG. 6 is performed by a model selection module such as model selection module 205 of FIG. 2.

At 601, a context-based model is selected by classifying the monitored metric data. For example, based on the characteristics and/or properties of the monitored metric, a context-based model type and model is selected. In some embodiments, the selection is determined by classifying data of the monitored metric. In various embodiments, the type of model selected can include one of a variety of model types including statistical, machine learning, or other model types. Based on classification results, the selected model can be fit to different existing models such as seasonal models, trend-based models, stationary models, noise-based models, and near-constant models, among other models. In some embodiments, once the model is selected, additional training may need to be performed to fit the model to the monitored metric.

At 603, the selected model is trained using historical data. For example, the model and/or model type selected at 601 is improved by training the model using historical data. In some embodiments, the training data includes a window of historical data and may include recently captured time-series data of the monitored metric. In some embodiments, the model may be pretrained and/or the model may require training and/or supplemental or additional training. In various embodiments, once trained, the context-based model can be applied to time-series data of the monitored metric to determine prediction scores.

At 605, the selected model is validated. For example, in some embodiments, once the model is trained and/or as part of the training process, the model is validated to evaluate its performance including its accuracy and reliability. In some embodiments, a separate set of data is used during the validation step to ensure that the model is not overfit to the training data. In some embodiments, the validation is performed to access the accuracy, precision, recall, and/or other performance metrics of the selected context-based model. In the event the validation does not meet requirements, the training step at 603 and/or even the selection step at 601 can be repeated before another validation step at 605 is performed.

At 607, the selected model is deployed for anomaly prediction. For example, the selected and trained context-based model is deployed in anticipation of performing anomaly prediction. In some embodiments, the model is deployed to one or more inference servers and/or prediction servers. In various embodiments, the deployed model including its model weights can be stored, such as in a model data store, prior to deployment. Although deployed at 607, the selected context-based model may require additional parameters for performing anomaly prediction including context-based bounds.

Figure 7:
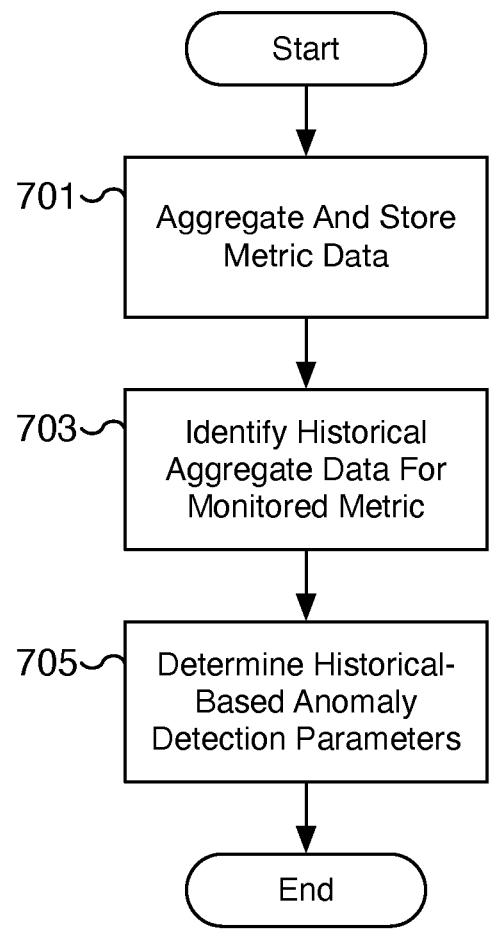
FIG. 7 is a flow chart illustrating an embodiment of a process for determining historical-based anomaly detection parameters for a monitored metric.

FIG. 7 is a flow chart illustrating an embodiment of a process for determining historical-based anomaly detection parameters for a monitored metric. For example, using the process of FIG. 7, context-based historical data is retrieved that is applicable to anomaly prediction. In some embodiments, the historical data is stored as aggregated data and includes data distribution data such as statistical information and historical values that are relevant to anomalies associated with the monitored metric. The relevant anomaly detection parameters are retrieved from the aggregated historical data and can be integrated with other anomaly detection parameters determined by other context-based analysis steps. In some embodiments, the process of FIG. 7 is performed at 303 of FIG. 3 and/or at 405 of FIG. 4 by an anomaly detection service such as anomaly detection service 121 of FIG. 1 and/or anomaly detection service 200 of FIG. 2. In some embodiments, the process of FIG. 7 is performed by an aggregate historical data module such as aggregate historical data module 207 of FIG. 2.

At 701, data associated with the metric is aggregated and stored. For example, time-series data of the monitored metric is collected over time and stored. In some embodiments, the data is stored as aggregated data allowing for a larger volume of data to be captured with reduced resource requirements. Along with storing certain historical values of the metric data, data distribution values including statistical information of the metric are stored. For example, as additional new data values are received, the maximum and minimum historical values can be determined, updated, and stored along with updated data distribution information related to the standard deviation, mean, skewness, kurtosis, and highest anomalous data point among historical values, among other aggregated historical data distribution information. In some embodiments, the data is stored using an index based on the metric name, monitored device, monitoring agent, or another property associated with the monitored metric.

At 703, historical aggregated data for the monitored metric is identified. For example, once a monitored metric is configured for anomaly detection, the historical aggregated data for the monitored metric stored and updated at 701 is identified. In some embodiments, the data is stored in a data store such as a corresponding database or similar repository and may be indexed by a metric identifier. At 703, the historical aggregated data is identified, for example, by determining the appropriate identifier for the monitored metric and identifying the associated historical aggregated data repository by the determined metric identifier and repository index.

At 705, historical-based anomaly detection parameters are determined. For example, using the historical aggregated data identified at 703 for the monitored metric, the relevant anomaly detection data is retrieved and used to determine historical-based anomaly detection parameters. In some embodiments, the data may require additional processing before the retrieved data can be utilized as anomaly detection parameters. For example, the data may require conversion to different units and/or additional conversions are performed based on the retrieved data distribution and/or statistical information values. For example, historical maximum and minimum values can be retrieved and used as factors to determine context-based bounds. Other statistical properties such as standard deviation, mean, skewness, etc. can be utilized as factors to further adjust the context-based bounds.

Figure 8:
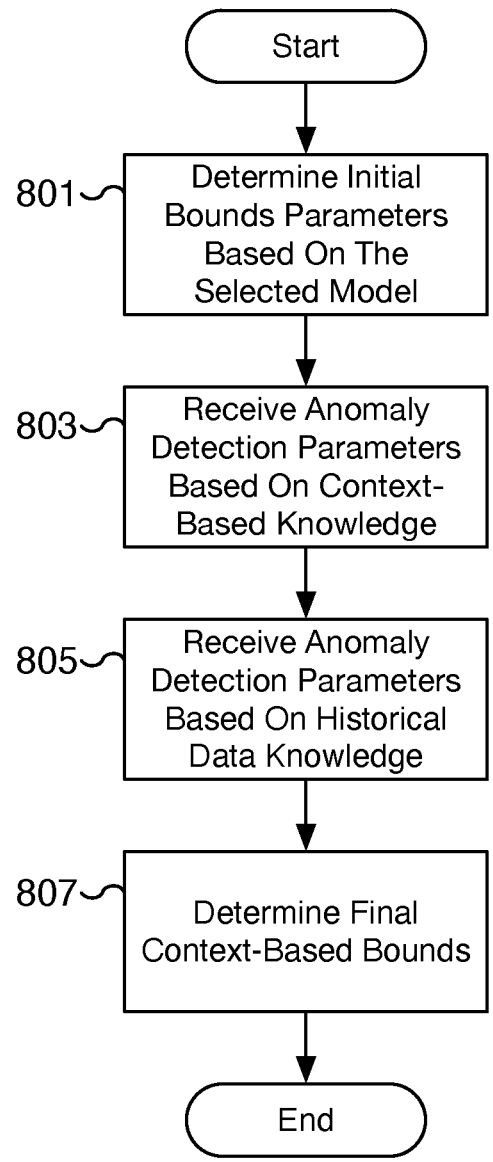
FIG. 8 is a flow chart illustrating an embodiment of a process for determining context-based bounds for anomaly prediction scores.

FIG. 8 is a flow chart illustrating an embodiment of a process for determining context-based bounds for anomaly prediction scores. For example, using the process of FIG. 8, context-based analysis results from multiple different context-based analysis steps can be integrated to determine context-based bounds to apply to anomaly prediction scores. In various embodiments, the applied context-based bounds are used to trigger the detection of an anomaly. In some embodiments, the different layers of context-based analysis include a context-based model selected to best fit the monitored metric data, context-based knowledge of the metric, and context-based historical data of the metric. In some embodiments, the process of FIG. 8 is performed at 303 of FIG. 3 and/or at 407 of FIG. 4 by an anomaly detection service such as anomaly detection service 121 of FIG. 1 and/or anomaly detection service 200 of FIG. 2. In some embodiments, the process of FIG. 8 is performed by a context-based prediction module such as context-based prediction module 209 of FIG. 2.

At 801, initial bounds parameters are determined based on the selected model. For example, the selected context-based model is trained with historical metric data allowing the trained model to predict anomaly prediction scores. In various embodiments, values for initial bounds parameters can be determined using the selected model and its training processes and can include an upper bound, a lower bound, and additional statistical values such as mean and certain percentile values (such as 1st, 25th, 33rd, 66th, 75th, and/or 99th percentile values, as examples). For example, the initial bounds can be based on the values present in the training data including anomalies and their corresponding metric data values in the training data. In some embodiments, the initial bounds can also be based on and include statistical values such as the standard deviation and mean of the training data and/or expected prediction scores. Although potentially accurate, the initial bounds are likely to capture many false positives since, for example, the representative values within the training data corresponding to anomalies may be limited. To improve on the initial bounds, additional anomaly detection parameters are utilized to determine more precise and accurate context-based bounds.

At 803, anomaly detection parameters based on available context-based knowledge are received. For example, anomaly detection parameters based on context-based knowledge are retrieved and provided as factors to determine context-based bounds. In some scenarios, no additional context-based knowledge is available, and this step is optional. However, in the event context-based knowledge is available, the knowledge-based anomaly detection parameters are received for use as factors to determine the final context-based bounds. In various embodiments, the anomaly detection parameters based on available context-based knowledge include a maximum upper bound, a minimum lower bound, and whether a higher (or lower) value is associated with a decrease in the likelihood of an anomaly. The received maximum upper bound and a minimum lower bound received at 803 are based on existing contextual knowledge of the metric and may be more representative of anomaly boundary limits than the upper and lower bound values determined at 801.

At 805, anomaly detection parameters based on historical data knowledge are received. For example, anomaly detection parameters based on data distribution knowledge from aggregated historical data are retrieved and provided as factors to determine the final context-based bounds. In various embodiments, the anomaly detection parameters based on historical data knowledge can include mean values, standard deviation values, historical lower bound values, historical upper bound values, and/or historical minimum/maximum values among other aggregated distribution data information. In some embodiments, received anomaly detection parameters are based on multiple different data time windows such as windows corresponding to different training windows, training rounds, and/or metric monitoring time windows. Other time windows of data may be appropriate as well. For example, historical-based anomaly detection parameters for mean, standard deviation, and percentile values (such as 1 st, 25th, 33rd, 66th, 75th, and/or 99th percentile values, as examples) can be based on the mean of the historical values across three, five, ten, or another number of different windows of data. Similarly, historical-based anomaly detection parameters for lower bound, upper bound, maximum historical value, and minimal historical value can be based on the minimum or maximum values (as appropriate) for historical values across three, five, ten, or another number of different windows of data. In various embodiments, the received historical upper and lower bound values received at 805 are context-based historical values and may be more representative of anomaly boundary limits than the upper and lower bound values determined at 801.

At 807, the final context-based bounds are determined. For example, the final context-based bounds can be determined based on the initial model-based bounds determined at 801 and the anomaly detection parameters received at 803 and/or 805. In some embodiments, the determination of the final context-based bounds includes determining one or more intermediate statistical values such as a weighted standard deviation and/or a standardized mean difference. The intermediate statistical values can be determined based on anomaly detection parameters received at 803 and/or 805 and include values based on multiple windows of data. For example, a weighted standard deviation value can correspond to the weighted variability based on the standard deviation of the training data for the context-based model and the mean standard deviation based on historical data knowledge. The weighted standard deviation can be determined based on a training data standard deviation for the context-based model and a corresponding mean standard deviation based on historical data knowledge. Similarly, a standardized mean difference value can be determined based on a standard deviation and mean for the context-based model and a corresponding standard deviation and mean based on historical data knowledge. Moreover, in various embodiments, the final context-based bounds are determined differently depending on whether a higher or lower value is associated with a decrease in the likelihood of an anomaly.

In some embodiments, in the event a higher value is associated with an increase in the likelihood of an anomaly, such as the scenario where a higher CPU load metric is associated with an increase in the likelihood of an anomaly, the context-based upper and lower bounds can be determined differently than in the event a higher value is associated with a decrease in the likelihood of an anomaly. For example, in the event a higher value is associated with an increase in the likelihood of an anomaly, the final upper bound can be adjusted depending on the relationship between the maximum upper bound based on existing contextual knowledge compared to the upper bound of the context-based model using a percentage of the weighted standard deviation as an offset. In the event the maximum upper bound based on existing contextual knowledge is significantly large, the final upper bound can be determined as a factor of the upper bound of the context-based model, a historical high percentile value (such as the mean historical 99th percentile value), the maximum upper bound based on existing contextual knowledge, and the weighted standard deviation. In many scenarios, this new final upper bound will raise the upper bound to remove false positives that would otherwise be captured by the upper bound of the context-based model.

In the event the maximum upper bound based on existing contextual knowledge is not significantly large in comparison (or no relevant contextual knowledge is available), the final upper bound can be adjusted depending on the relationship between the mean upper bound based on historical data knowledge compared to the upper bound of the context-based model using a percentage of the weighted standard deviation as an offset. In the event the mean upper bound based on historical data knowledge is significantly large, the final upper bound can be determined based on mean and percentile value calculations using factors such as the upper bound of the context-based model, the weighted standard deviation, the mean upper bound based on historical data knowledge, and a historical high percentile value (such as the mean historical 99th percentile value). The final upper bound determination can utilize mean or percentile value calculations based on the value of the standardized mean difference. For example, for certain values of the standardized mean difference, such as lower standardized mean difference values and/or those below a threshold value, the final upper bound can be determined using a higher percentile calculation (such as the 66th or 75th percentile value calculation) whereas for values of the standardized mean difference above the threshold, the final upper bound can be determined using a mean or lower percentile calculation.

Alternatively, in the event neither the maximum upper bound based on existing contextual knowledge nor the mean upper bound based on historical data knowledge are sufficiently large compared to the upper bound of the context-based model using a percentage of the weighted standard deviation as an offset (or no relevant knowledge is available), the final upper bound can be determined based solely or primarily on the upper bound of the context-based model. In various embodiments, different scenarios such as the ones described can exist, and depending on the scenario, different context-based parameters including factors based on contextual knowledge and/or historical knowledge are utilized to adjust the final upper bound.

In some embodiments, in the event a higher value is associated with an increase in the likelihood of an anomaly, the final lower bound can be adjusted depending on the relationship between the minimum lower bound based on existing contextual knowledge compared to the lower bound of the context-based model using a percentage of the weighted standard deviation as an offset. In the event the minimum lower bound based on existing contextual knowledge is significantly small, the final lower bound can be based on a lower percentile calculation (such as the 25th or 33rd percentile value calculation) using factors such as a historical low percentile value (such as the mean historical 1st percentile value), the mean lower bound based on historical data knowledge, the lower bound of the context-based model, and the minimum lower bound based on existing contextual knowledge using percentages of the weighted standard deviation as offsets.

In the event the minimum lower bound based on existing contextual knowledge is not significantly small in comparison (or no relevant contextual knowledge is available), the final lower bound can be adjusted depending on the relationship between the mean lower bound based on historical data knowledge compared to the lower bound of the context-based model using a percentage of the weighted standard deviation as an offset. In the event the mean lower bound based on historical data knowledge is significantly small, the final lower bound can be determined based on a lower percentile calculation (such as the 25th or 33rd percentile value calculation) using factors such as a historical low percentile value (such as the mean historical 1 st percentile value), the lower bound of the context-based model, and the mean lower bound based on historical data knowledge using percentages of the weighted standard deviation as offsets.

Alternatively, in the event neither the minimum lower bound based on existing contextual knowledge nor the mean lower bound based on historical data knowledge are sufficiently small compared to the lower bound of the context-based model using a percentage of the weighted standard deviation as an offset (or no relevant knowledge is available), the final lower bound can be determined based solely or primarily on the lower bound of the context-based model. In various embodiments, different scenarios such as the ones described can exist, and depending on the scenario, different context-based parameters including factors based on contextual knowledge and/or historical knowledge are utilized to adjust the final lower bound.

In the examples described above, the determined final upper and lower bounds are context-based bounds and can be determined using context-based anomaly detection parameters when a higher value of the monitored metric is associated with an increase in the likelihood of an anomaly. Similarly, the final context-based upper and lower bounds can be determined using context-based anomaly detection parameters when a lower value of the monitored metric is associated with an increase in the likelihood of an anomaly, such as for a metric corresponding to available free memory where lower amounts of free memory are associated with an increase in the likelihood of an anomaly. In various embodiments, for metrics with this property, the final context-based lower bound can be determined by comparing the minimum lower bound based on existing contextual knowledge and/or the mean lower bound based on historical data knowledge to the lower bound of the context-based model using a percentage of the weighted standard deviation as an offset, and the final context-based upper bound can be determined by comparing the maximum upper bound based on existing contextual knowledge and/or the mean upper bound based on historical data knowledge to the upper bound of the context-based model using a percentage of the weighted standard deviation as an offset. In various embodiments, depending on the particular scenario and the tolerance for false positives, different factors and weights can be applied to the appropriate anomaly detection parameters to determine the final context-based bounds.

Figure 9:
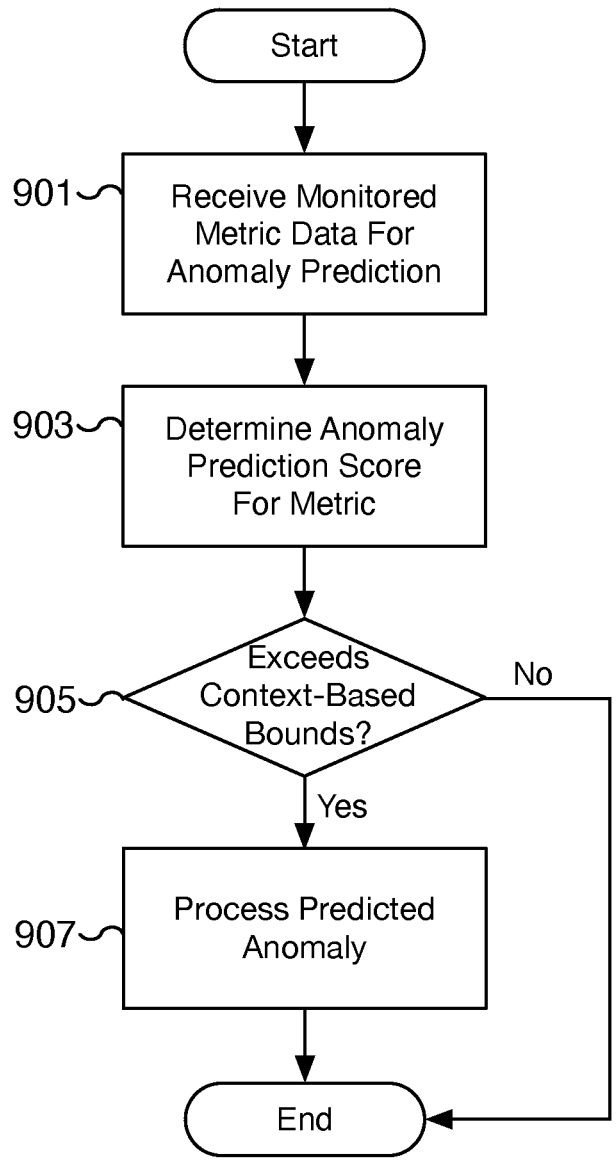
FIG. 9 is a flow chart illustrating an embodiment of a process for predicting anomalies for a monitored metric using context-based bounds.

FIG. 9 is a flow chart illustrating an embodiment of a process for predicting anomalies for a monitored metric using context-based bounds. For example, using the process of FIG. 9, context-based bounds are applied to anomaly prediction scores to determine whether an anomaly has been detected. In some embodiments, the process of FIG. 9 is performed by applying a context-based model to time-series data for a monitored metric. In the event an anomaly is detected, a configured workflow can be performed that can include actions such as providing notifications and initiating failover measures. In various embodiments, the process of FIG. 9 can be repeated as additional metric data is received and can be run continuously, for example, as long as the metric is being monitored for new anomalies. In some embodiments, the process of FIG. 9 is performed at 307 of FIG. 3 by an anomaly detection service such as anomaly detection service 121 of FIG. 1 and/or anomaly detection service 200 of FIG. 2. In some embodiments, the process of FIG. 9 is performed by a context-based prediction module such as context-based prediction module 209 of FIG. 2.

At 901, monitored metric data is received for anomaly prediction. For example, time-series data of the monitored metric is received and prepared for anomaly prediction. For example, in some embodiments, the monitored metric data may be preprocessed before it can be applied to a selected context-based model for anomaly prediction. In some embodiments, the data is gathered continuously and may be received continuously and/or in batches. Consequently, the process of FIG. 9 can be performed continuously starting with step 901 with each newly received batch of data and/or at set intervals.

At 903, an anomaly prediction score is determined for the monitored metric. For example, an anomaly prediction score is determined by applying a context-based model to the time-series data of the monitored metric received at 901. In various embodiments, the context-based model is a model fitted to the monitored metric data and can include a statistical model, a machine learning model, or another prediction model used to determine anomaly prediction scores.

At 905, a determination is made whether the anomaly prediction score exceeds the context-based bounds. In the event the anomaly prediction score exceeds the context-based bounds, processing proceeds to 907 where an anomaly is detected. In the event the anomaly prediction score does not exceed the context-based bounds, processing ends and no anomaly is detected. In various embodiments, once the process of FIG. 9 ends, the process of FIG. 9 can be repeated as additional metric data is received.

At 907, a predicted anomaly is processed. For example, once an anomaly score exceeds the context-based bounds indicating an anomaly has been detected, the appropriate anomaly detection workflow is initiated to process the predicted anomaly. In some embodiments, the workflow includes notifying the appropriate entities, such as an administrator or operator, based on an anomaly detection configuration. The initiated notifications can include email and other forms of notifications and alerts as well as dashboard notifications provided via a graphical user interface for monitoring the target device and/or environment. In some embodiments, the workflow includes performing failover processes such as requiring enhanced security measures and/or disabling certain access privileges. In some embodiments, the anomaly is logged and the corresponding metric data and related parameters are stored and utilized for future anomaly detection including as potential training data.

Figure 10:
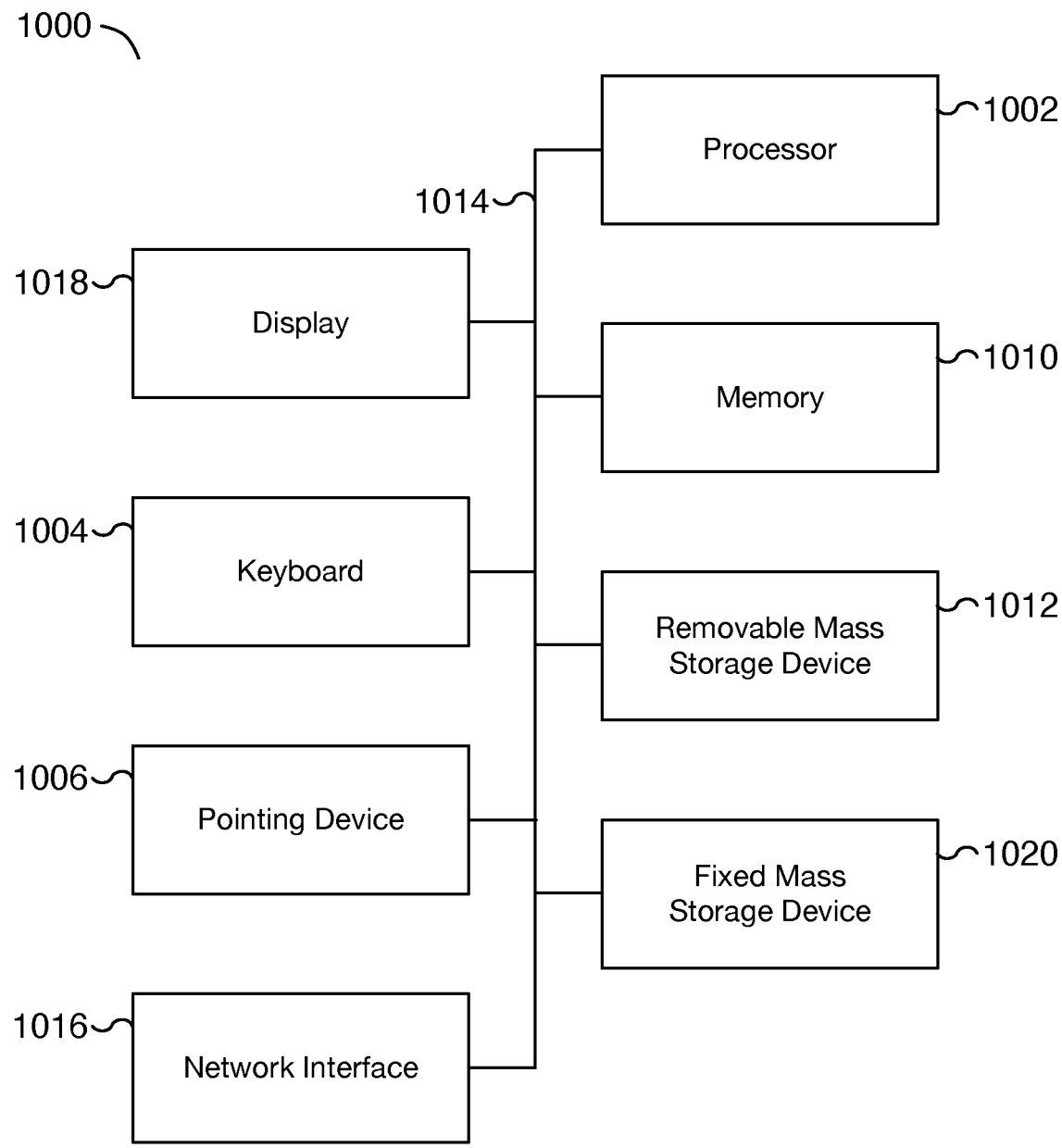
FIG. 10 is a functional diagram illustrating a programmed computer system for performing context-based anomaly detection.

FIG. 10 is a functional diagram illustrating a programmed computer system for performing context-based anomaly detection. As will be apparent, other computer system architectures and configurations can be utilized for performing improved context-based anomaly detection including those with one or more graphical processing units (GPUs). Examples of computer system 1000 include client 101 of FIG. 1, one or more computers of anomaly detection service 121 of FIG. 1, one or more devices of customer network environment 111 of FIG. 1, one or more computers of anomaly detection service 200 of FIG. 2, one or more computers of anomaly detection application server 201 of FIG. 2, and/or one or more computers of data store 221 of FIG. 2. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018). In various embodiments, one or more instances of computer system 1000 can be used to implement at least portions of the processes of FIGS. 3-9 and the user interface of FIG. 11.

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data and objects used by the processor 1002 to perform its functions (e.g., programmed instructions). For example, memory 1010 can include any suitable computer-readable storage media, described below, depending on whether, for example, data access needs to be bi-directional or unidirectional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or unidirectionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storages 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Figure 11:
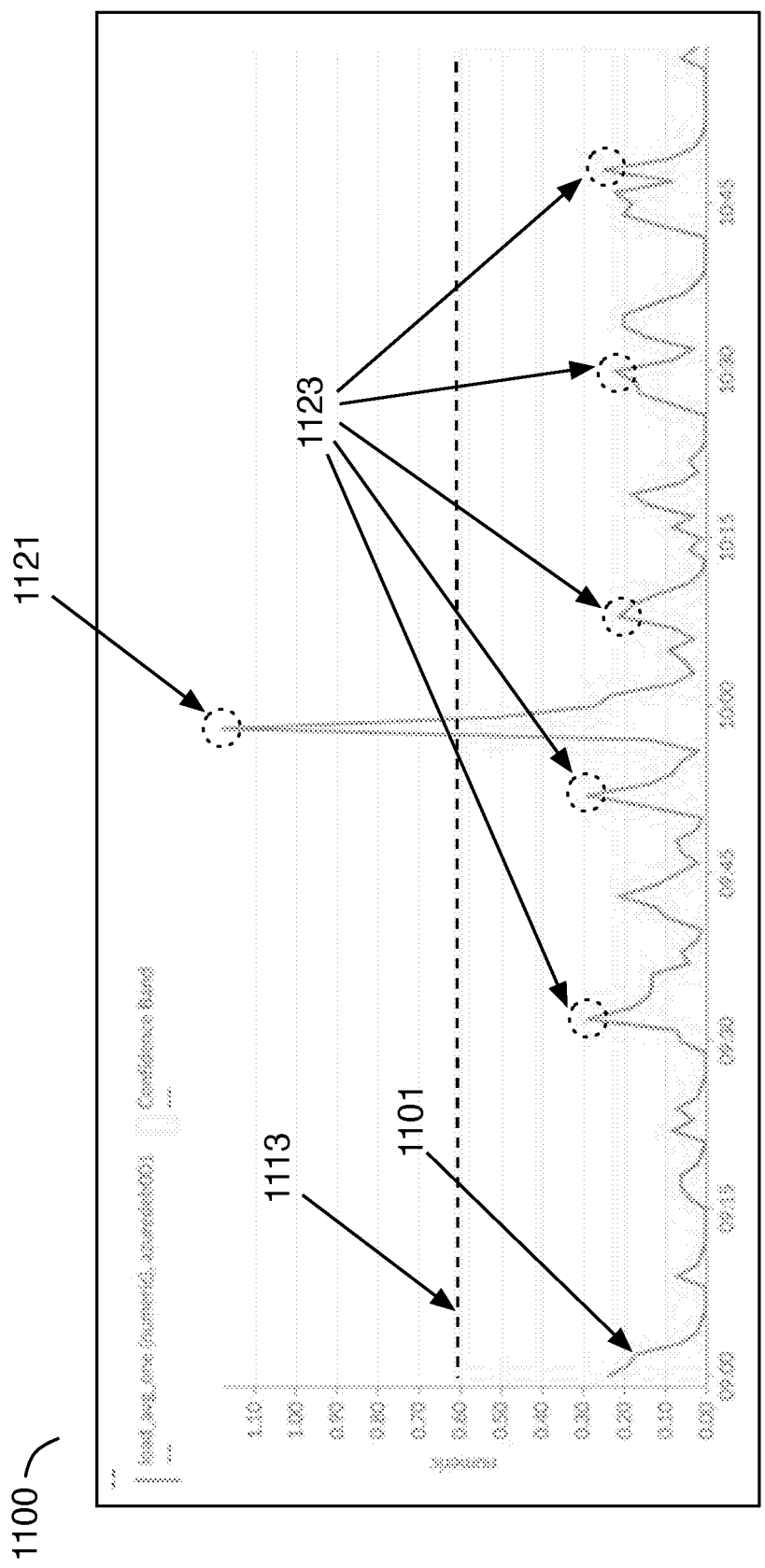
FIG. 11 is a diagram illustrating an embodiment of a user interface of an anomaly detection service for displaying a monitored metric.

FIG. 11 is a diagram illustrating an embodiment of a user interface of an anomaly detection service for displaying a monitored metric. In the example shown, user interface 1100 is a user interface view of an anomaly detection service that displays time-series data 1101 of a monitored metric along with context-based confidence upper bound 1113. The X-axis of the displayed graph of user interface 1100 corresponds to time and the Y-axis corresponds to the captured numeric value of the monitored metric. In the example shown, time-series data 1101 corresponds to captured metric values associated with the average load, such as average CPU load, of a monitored device and varies over time. In the case of the specific metric shown in FIG. 11, a higher metric value is associated with an increase in the likelihood of an anomaly.

In various embodiments, the dotted line corresponding to context-based confidence upper bound 1113 corresponds to the upper metric value allowed within the confidence band. Behavior corresponding to values that exceed context-based confidence upper bound 1113 can correspond to detected anomalies such as detected anomaly 1121. Behavior corresponding to values below context-based confidence upper bound 1113 (and within the corresponding confidence band) does not trigger a detected anomaly. Rejected false positives 1123 are examples of behavior that would otherwise trigger a detected anomaly with a conventional and non-context-based upper bound.

In various embodiments, a context-based bound is determined that corresponds to context-based confidence upper bound 1113 using the processes disclosed herein including the processes of FIGS. 3-9. In some embodiments, the context-based bounds for the monitored metric are determined and anomalies are detected, such as the behavior associated with detected anomaly 1121, using anomaly detection service 121 of FIG. 1 and/or anomaly detection service 200 of FIG. 2. Although the determined context-based bounds and anomaly prediction scores used for anomaly prediction are not shown in FIG. 11, user interface 1100 shows the accurate detection of anomalies by applying context-based bounds to anomaly prediction scores and how the prediction results correspond to monitored metric values, their anomalous and non-anomalous behavior, and a context-based confidence band. In particular, the results shown in user interface 1100 emphasize the number of potential false positives that would otherwise trigger a detected anomaly without the disclosed anomaly detection techniques and systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving time-series data;
using an identifier of the time-series data, identifying contextual reference anomaly detection parameters from a repository in a first layer of context-based analysis;
classifying a data trend of the time-series data;
based on the classified data trend, selecting a type of model to be generated for the time-series data based on fitting the time-series data using the classified data trend and generating a model having generated anomaly detection parameters based on the selected type of model in a second layer of the context-based analysis;
identifying a history of anomaly detection parameters determined for the time-series data in a third layer of the context-based analysis, wherein the identified history of the anomaly detection parameters includes data distribution information associated with the time-series data;
integrating the first layer, the second layer, and the third layer of the context-based analysis by adjusting the generated anomaly detection parameters based on the contextual reference anomaly detection parameters and the history of anomaly detection parameters; and
applying the adjusted generated anomaly detection parameters to one or more anomaly scores.

2. The method of claim 1, wherein the identifier of the time-series data is determined at least in part by tokenizing a metric name associated with the time-series data.

3. The method of claim 1, wherein the identified contextual reference anomaly detection parameters from the repository include an upper bound and a lower bound.

4. The method of claim 3, wherein at least one of the identified contextual reference anomaly detection parameters from the repository indicates whether there exists a positive correlation or a negative correlation between values of the time-series data and a likelihood of an anomaly.

5. The method of claim 1, wherein the type of model is a statistical model or a machine learning model.

6. The method of claim 1, wherein the data distribution information includes a maximum historical value, a minimum historical value, a standard deviation value, a mean value, a skewness value, or a kurtosis value.

7. The method of claim 1, wherein adjusting the generated anomaly detection parameters based on the contextual reference anomaly detection parameters and the history of anomaly detection parameters includes determining a context-based upper bound or a context-based lower bound.

8. The method of claim 1, wherein adjusting the generated anomaly detection parameters includes determining a weighted standard deviation value based on training data associated with the generated model and at least one parameter of the history of anomaly detection parameters.

9. The method of claim 1, wherein adjusting the generated anomaly detection parameters includes determining a standardized mean difference value based on at least one of the contextual reference anomaly detection parameters and at least one parameter of the history of anomaly detection parameters.

10. A system comprising:
one or more processors; and a memory coupled to the one or more processors, wherein the memory is configured to provide the one or more processors with instructions which when executed cause the one or more processors to:
- receive time-series data;
- using an identifier of the time-series data, identify contextual reference anomaly detection parameters from a repository in a first layer of context-based analysis;
- classify a data trend of the time-series data;
- based on the classified data trend, select a type of model to be generated for the time-series data based on fitting the time-series data using the classified data trend and generate a model having generated anomaly detection parameters based on the selected type of model in a second layer of the context-based analysis;
- identify a history of anomaly detection parameters determined for the time-series data in a third layer of the context-based analysis, wherein the identified history of the anomaly detection parameters includes data distribution information associated with the time-series data;
- integrate the first layer, the second layer, and the third layer of the context-based analysis by adjusting the generated anomaly detection parameters based on the contextual reference anomaly detection parameters and the history of anomaly detection parameters; and
- apply the adjusted generated anomaly detection parameters to one or more anomaly scores.

11. The system of claim 10, wherein the identified contextual reference anomaly detection parameters from the repository include an upper bound and a lower bound.

12. The system of claim 11, wherein at least one of the identified contextual reference anomaly detection parameters from the repository indicates whether there exists a positive correlation or a negative correlation between values of the time-series data and a likelihood of an anomaly.

13. The system of claim 10, wherein the type of model is a statistical model or a machine learning model.

14. The system of claim 10, wherein the data distribution information includes a maximum historical value, a minimum historical value, a standard deviation value, a mean value, a skewness value, or a kurtosis value.

15. The system of claim 10, wherein adjusting the generated anomaly detection parameters based on the contextual reference anomaly detection parameters and the history of anomaly detection parameters includes determining a context-based upper bound or a context-based lower bound.

16. The system of claim 10, wherein adjusting the generated anomaly detection parameters includes determining a weighted standard deviation value based on training data associated with the generated model and at least one parameter of the history of anomaly detection parameters.

17. The system of claim 10, wherein adjusting the generated anomaly detection parameters includes determining a standardized mean difference value based on at least one of the contextual reference anomaly detection parameters and at least one parameter of the history of anomaly detection parameters.

18. A computer program product, the computer program product being embodied in a non-transitory computer readable storage medium and comprising computer instructions for:
- receiving time-series data;
- using an identifier of the time-series data, identifying contextual reference anomaly detection parameters from a repository in a first layer of context-based analysis;
- classifying a data trend of the time-series data;
- based on the classified data trend, selecting a type of model to be generated for the time-series data based on fitting the time-series data using the classified data trend and generating a model having generated anomaly detection parameters based on the selected type of model in a second layer of the context-based analysis;
- identifying a history of anomaly detection parameters determined for the time-series data in a third layer of the context-based analysis, wherein the identified history of the anomaly detection parameters includes data distribution information associated with the time-series data;
- integrating the first layer, the second layer, and the third layer of the context-based analysis by adjusting the generated anomaly detection parameters based on the contextual reference anomaly detection parameters and the history of anomaly detection parameters; and
- applying the adjusted generated anomaly detection parameters to one or more anomaly scores.

* * * * *